W. D. BALCOM.
COFFEE CLEANING APPARATUS.
APPLICATION FILED JUNE 21, 1909.

957,138.

Patented May 3, 1910.
2 SHEETS—SHEET 1.

Witnesses
Otto E. Hoddick.
Harry T. Simmons

Inventor
W. D. Balcom.
By A. J. O'Brien.
Attorney

UNITED STATES PATENT OFFICE.

WILLIAM D. BALCOM, OF GREELEY, COLORADO, ASSIGNOR OF ONE-HALF TO NELLA C. BALCOM, OF GREELEY, COLORADO, ONE-FOURTH TO JOHN W. MOREY, AND ONE-FOURTH TO EDGAR E. SELLERS, BOTH OF DENVER, COLORADO.

COFFEE-CLEANING APPARATUS.

957,138.        Specification of Letters Patent.        Patented May 3, 1910.

Application filed June 21, 1909. Serial No. 503,360.

*To all whom it may concern:*

Be it known that I, WILLIAM D. BALCOM, a citizen of the United States, residing at Greeley, county of Weld, and State of Colorado, have invented certain new and useful Improvements in Coffee-Cleaning Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for cleaning ground coffee, or separating it from the chaff or light material, which, when left in the coffee, gives the drink made therefrom a bitter taste.

In my improved construction, the coffee is discharged into a conduit connected with suction producing apparatus, whereby an upwardly directed current of air is produced, the said current traveling in a direction opposite that of the falling coffee. In my improved construction, I employ two conduit members, connected with suction apparatus, and in which the falling coffee is subjected to the influence of the suction. These two conduits are separated and between them is interposed a conduit member, through which the coffee also passes, but in which the material is not subjected to the influence of the suction. This dead conduit member is necessary in order that the chaff and light material which cling to a portion of the coffee may be released before passing to the second conduit member, where it is again subjected to the influence of the suction. In each of these conduit members, is located a perforated spreader, which separates or spreads the coffee during its passage through the said member, whereby it permits the air current to more advantageously perform the cleaning function.

Having briefly outlined my improved construction, I will proceed to describe the same in detail, reference being made to the accompanying drawing, in which is illustrated an embodiment thereof.

Figure 1:
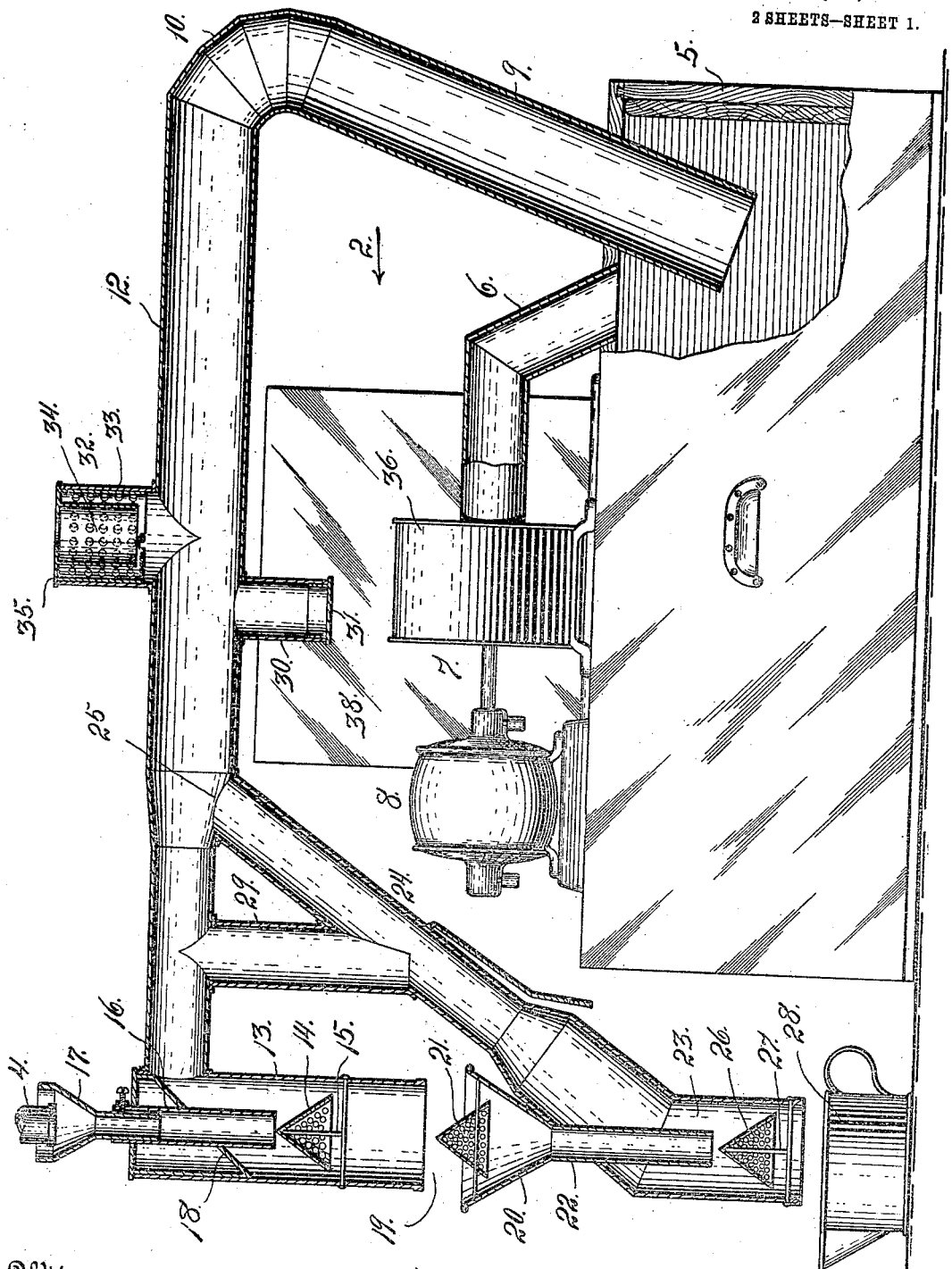
Figure 2:
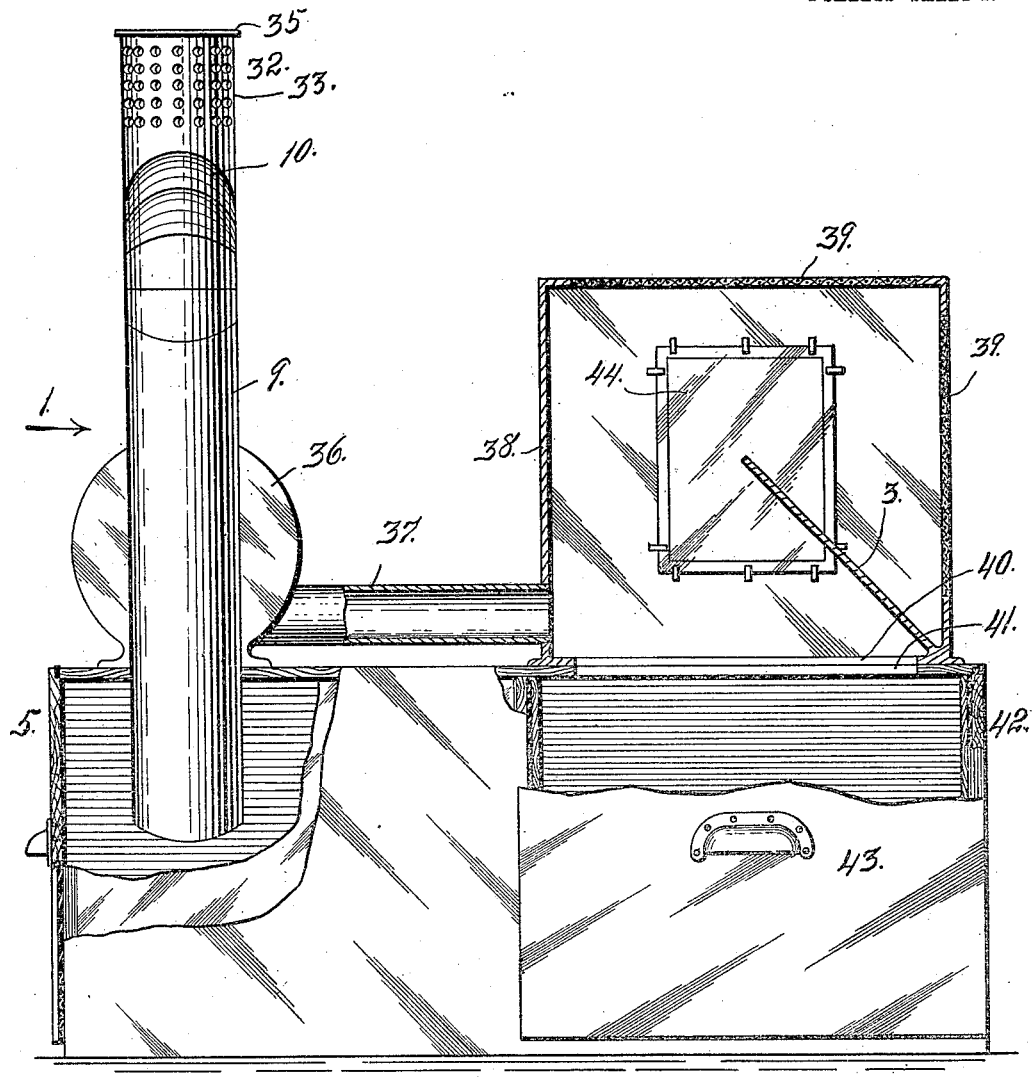

In this drawing: Figure 1 is a side elevation of my improved apparatus, the conduit portion of the apparatus being shown principally in section. This is a view looking in the direction of arrow 1, Fig. 2. Fig. 2 is an end view of my improved apparatus, partly in elevation and partly in section.

The same reference characters indicate the same parts in both views.

Let the numeral 5 designate an air box, with which is connected an elbow-shaped conduit 6, leading to a suction fan 7, operated by a motor 8. Also communicating with the box 5 is a pipe member 9, connected by an elbow 10 with a continuing member 12, communicating at its upper extremity with a vertically disposed conduit member 13, in which is located a perforated cone-shaped spreader 14, mounted on a skeleton support 15. Protruding through the opening formed in the upper extremity of the conduit member 13 is a relatively small pipe 16, with which is adjustably connected a funnel 17, through which the coffee to be cleaned is fed to the apparatus. Located in the upper part of the conduit 13 is an inclined partition 18, having an opening through which the feed pipe 16 passes. The lower extremity of this feed pipe is located just above the apex of the cone-shaped spreader 14.

Below the lower extremity of the conduit member 13 and separated therefrom by an air space 19, is a funnel-shaped member 20, whose upper extremity is located far enough below the lower extremity of the member 13 so that when the coffee reaches the member 20, it has passed entirely beyond the influence of the suction acting through the member 13. Within the upper part of the member 20 is located a perforated cone-shaped member 21, whose apex protrudes above the bottom of the member 20. This apex, however, is still far enough below the lower extremity of the member 13, so that as soon as the coffee strikes the cone 21, it is beyond the influence of the suction in the pipe 13. The lower reduced extremity 22 of the funnel-shaped member 20 enters the lower part 23 of an inclined conduit member 24, whose upper extremity communicates with the pipe member 12, as shown at 25. The part 23 of the conduit member 24 occupies a vertical position, and in its lower portion is located a perforated spreader 26, mounted upon the skeleton frame 27 located just above the lower open extremity of the part 23.

Below the lower extremity of the last named conduit member is located a receptacle 28 adapted to receive the cleaned coffee, after it has passed through the vertically disposed coffee cleaning conduit members.

The upper extremity of the inclined conduit member 24 is located some distance forward of the conduit member 13, and between the upper extremity 25 of the conduit member 24 and the conduit member 13 is located a relatively short vertically disposed pipe section 29, which communicates with the conduit member 24, and the pipe member 12. When the apparatus is in use, this pipe section 29 is supposed to be practically free from the suction influence, to which both of the members 24 and 12 are subjected. In other words, the arrangement is supposed to be such that any coffee so heavy that it is desirable to save it or separate it from the light material passing through the member 12, will fall through the pipe section 29 and pass into the inclined conduit member 24 and fall thence downwardly into the vertical coffee-cleaning section 23. Attention is called to the fact that the draft or air current resulting from the suction producing apparatus is weaker in the member 24 than in the member 12, since the lower open extremity of the member 23 is farther from the source of suction than the lower extremity of the conduit member 13, with which the rear extremity of the member 12 is connected. Hence, coffee which might be carried into the rear portion of the conduit member 12, after falling into the conduit member 24, would be heavy enough to resist the suction in the last named conduit member, for the reason heretofore stated.

Located forward of the upper extremity of the conduit member 24, and connected with the lower part of the conduit member 12, is a sort of depending cup 30, having a removable flanged bottom 31. Any heavy material which has passed as far as this cup 30 in the conduit member 12, will fall thereinto and may be removed by detaching the removable bottom 31. Connected with the upper part of the conduit member is an air check 32, consisting of an outer perforated casing 33 and an inner perforated casing 34, the inner casing having a cap 35, which allows it to be turned within the outer casing for the purpose of closing or partially closing the registering perforations of the two casing members, for the purpose of regulating the draft through the member 12.

The casing 36 of the fan 7 is connected by means of a pipe 37 with a box 38, whose walls are partially composed of screen material 39. The bottom of this box is open, as shown at 40 and this opening communicates with an opening 41, formed in the top of a box 42, having a drawer 43. The box 38 is provided with an inclined deflecting plate 3, connected with the lower corner of the box, remote from where it is connected with the pipe 37 and extends upwardly at an angle of about 45 degrees in front of the opening of the pipe 37, where it joins the box 38. This box 38 is also provided with a window 44, through which the operations going on within the box may be observed. The function of the pipe 37 is to carry the material which may escape from the box 5 by virtue of the suction through the pipe 6, into the box 38 and cause it to fall downwardly into the box 42.

Attention is called to the fact that the perforations of the spreaders 14, 21 and 26 are of sufficient size to permit the passage of the material as coffee therethrough thus causing the coffee or other material to be uniformly or approximately uniformly distributed over the entire cross sectional area of the conduits in which the said spreaders are located. By reason of this fact the suction in the pipes 13 and 23 is allowed to act more advantageously upon the material for cleaning purposes.

From the foregoing description, the use and operation of my improved coffee cleaning apparatus will be readily understood. Assuming that the motor is set in motion, whereby the fan 7 is operated, any desired strength of suction through the pipe 6 may be obtained. The interior of the box 5 will thus be subjected to the suction produced by the fan, and this suction will act through the pipe members 9, 10, 12 and the coffee cleaning member 13, the length of the suction channel being from the lower open extremity of the pipe 13, to the suction fan 7. The coffee to be cleaned is discharged from the inlet pipe 4 into the funnel 17, and passes thence downwardly through the feed pipe 16 and falls upon the perforated spreader 14, whence it passes through the lower extremity of the pipe 13 and falls upon the second spreader 21. The object of the inclined plate 18 is to equalize the suction influence as far as possible over the entire cross sectional area of the conduit member 13. If it were not for this plate 18, the distance of travel of the air current from the lower extremity of the rear side of the conduit 13 upwardly to the extremity of the member 12, would be farther than the travel from the front side of the lower extremity of the conduit member 13 to the pipe 12. However, by placing the plate 18 within the conduit member, the travel or distance from the lower extremity of the member 13 to the adjacent extremity of the pipe 12 is quite nearly equalized, over the entire cross sectional area of the member, thus subjecting all of the material to approximately the same suction influence, whereby the said material is cleaned. As soon, however, as the material leaves the lower extremity of the member 13, and has passed a short distance below the same, coming in contact with the perforated spreader 21, it passes beyond the suction influence and this sudden change of condition causes the material to fall with greater force upon the spreader 21, whereby any light material or chaff that may have been clinging to the coffee, will be shaken off, as the material rolls downwardly over the spreader 21 and passes thence through the funnel-shaped member 20 into the conduit section 23 where it is again subjected to the influence of the suction through the pipe 24, whereby the light material, separated or loosened from the coffee, as heretofore explained, is carried upwardly through the member 24, into the member 12, thus completing the cleaning operation. All of the chaff and light material is carried, after it reaches the conduit member 12, downwardly into the box 5. The lower extremity of the pipe section 9 projects some distance downwardly into the box 5 below the inlet extremity of the suction pipe 6, and most of the light material will fall downwardly into the box. However, a small portion of this material will be drawn by the suction through the pipe 6 into the fan casing 36, whence it will be forced through the pipe 37 into the box 38, where it will be brought into contact with the deflecting plate 43 and caused to fall downwardly into the box 42 containing the drawer 43. By removing this drawer the contents of the box may be disposed of. As heretofore explained, the heavy coffee which enters the rear portion of the pipe member 12 will fall downwardly through the conduit 29 into the member 24 and pass thence downwardly into the receptacle 28.

Having thus described my invention, what I claim is:

1. In coffee cleaning apparatus, the combination of a conduit member, containing a cone-shaped spreader perforated to permit the passage of coffee therethrough, suction producing means connected with the conduit, above the spreader and means connected with the upper part of the conduit for feeding the material to be cleaned thereinto, and discharging it upon the spreader, the lower extremity of the conduit being open.

2. The combination of a vertically disposed coffee cleaning conduit member, open at its lower extremity, suction producing apparatus in communication with its upper extremity, a spreader located therein and perforated to permit the passage of coffee, means for feeding the material to be cleaned into the said conduit, and a second conduit member, equipped with a spreader also perforated to permit the passage of coffee and located below the suction influence acting through the first named conduit for the purpose set forth.

3. In apparatus of the class described, the combination of two coffee cleaning conduit members, vertically arranged and in alinement with each other, a spreader located in each conduit member, suction producing apparatus communicating with the individual conduit members, above the spreaders in each, the conduit members being separated by a dead air space and a third member located in the dead air space and forming communication between the first named conduit members for the purpose set forth.

4. In apparatus of the class described, the combination of two coffee cleaning conduit members, each equipped with a cone shaped spreader perforated to permit the passage of coffee, suction producing apparatus communicating with both conduit members, the suction influence, however being weaker upon the lower member than upon the upper member and a conduit member interposed between the first named conduit members and forming a communication for the passage of the material to be cleaned from the upper to the lower member, the third conduit being located in the dead air space between the two members and equipped with a spreader upon which the material falls after passing beyond the suction influence of the uppermost member.

5. In coffee cleaning apparatus, the combination of two coffee cleaning conduit members, a cone-shaped spreader located in each conduit member and perforated to permit the passage of coffee, the said conduit members being separated by a dead air space, the two members being vertically disposed and in alinement, the one with the other, a suction producing apparatus communicating with both conduit members above their respective spreaders, the distance between the suction source and the lower conduit member being greater than that between the same source and the upper conduit member, and a third conduit member located in the dead air space between the two members and forming a passage way for the material falling from the upper member, the third conduit member having a spreader device for the purpose set forth.

6. In coffee cleaning apparatus, the combination of upper and lower coffee cleaning conduit members, suction producing apparatus communicating with said conduit members, by separate channels, whereby the suction influence is weaker in the lower member than in the upper member, the two members being separated by a dead air space, means located in the said air space for delivering the material from the upper member to the lower member, and a vertically disposed pipe, connecting the channels, leading from the suction producing apparatus to the respective coffee cleaning conduit members, the said pipe connection being so arranged that the suction influence through the channels with which it is connected approximately neutralize each other, whereby the space within the connecting member is practically free from the suction influence.

7. In coffee cleaning apparatus, the combination of two vertically disposed coffee cleaning conduit members, arranged one above the other, and separated by a dead air space, a third conduit member located in the dead air space and forming a passage way through which the material, after it passes from the upper member, is delivered to the lower member, pipes communicating with the respective upper and lower coffee cleaning conduit members, suction producing apparatus communicating with the said pipes by a main suction pipe, an air check for regulating the draft through the suction pipes, and a depending cup connected with the main suction pipe and provided with a removable closure for the purpose set forth.

8. In coffee cleaning apparatus the combination of two coffee cleaning conduit members, pipes communicating with the respective members, a main pipe with which the first named pipes are connected, suction producing means, including a fan, a box in communication with the said means, the main pipe also communicating with said box and projecting thereinto below its communication with the suction producing means.

In testimony whereof I affix my signature in presence of two witnesses.

WILLIAM D. BALCOM.

Witnesses:
A. J. O'BRIEN,
JESSIE F. HOBART.